(12) United States Patent
Nakagawa et al.

(10) Patent No.: US 9,031,676 B2
(45) Date of Patent: May 12, 2015

(54) ACTUATOR CONTROL SYSTEM

(75) Inventors: Shingo Nakagawa, Gifu (JP); Atsushi Fukui, Gifu (JP)

(73) Assignee: NABTESCO Corporation, Tokyo (JP)

( * ) Notice: Subject to any disclaimer, the term of this patent is extended or adjusted under 35 U.S.C. 154(b) by 764 days.

(21) Appl. No.: 13/091,609

(22) Filed: Apr. 21, 2011

(65) Prior Publication Data

US 2011/0264242 A1 Oct. 27, 2011

(30) Foreign Application Priority Data

Apr. 26, 2010 (JP) ................................ 2010-100821

(51) Int. Cl.
| | |
|---|---|
| G05B 9/02 | (2006.01) |
| G05B 9/03 | (2006.01) |
| G05B 23/02 | (2006.01) |
| G05D 1/00 | (2006.01) |
| B64C 13/42 | (2006.01) |

(52) U.S. Cl.
CPC .............. *G05B 9/03* (2013.01); *G05B 23/0237* (2013.01); *G05B 2219/14014* (2013.01); *G05B 2219/24182* (2013.01); *G05B 2219/24188* (2013.01); *G05B 2219/24191* (2013.01); *G05D 1/0077* (2013.01); *B64C 13/42* (2013.01)

(58) Field of Classification Search
USPC .................. 700/21, 79; 714/4.11, 11
See application file for complete search history.

(56) References Cited

U.S. PATENT DOCUMENTS

| | | |
|---|---|---|
| 4,622,667 A | 11/1986 | Yount |
| 4,807,516 A | 2/1989 | Takats |
| 4,887,214 A | 12/1989 | Takats et al. |
| 5,742,624 A * | 4/1998 | Irie et al. ...................... 714/799 |
| 6,591,287 B1 * | 7/2003 | More et al. ................... 718/102 |

(Continued)

FOREIGN PATENT DOCUMENTS

| | | |
|---|---|---|
| EP | 0525574 A2 | 2/1993 |
| JP | S64-60497 A | 3/1989 |

(Continued)

OTHER PUBLICATIONS

The extended European search report issued on Aug. 21, 2013, which corresponds to EP11163677.5 and is related to U.S. Appl. No. 13/091,609.

(Continued)

*Primary Examiner* — Kenneth Lo
*Assistant Examiner* — Chad Rapp
(74) *Attorney, Agent, or Firm* — Studebaker & Brackett PC (57) ABSTRACT

An operation control apparatus includes a command generation portion that generates a command signal for commanding operation of a control surface, and first and second monitoring portions that monitor an abnormality of operation of first and second control portions, respectively, of the actuator control apparatus. The actuator control apparatus includes first and second control portions that generate a control signal for an actuator for driving the control surface and that are different in design, and a switching unit that switches the connection to the actuator from one of the first and second control portions to the other, when an abnormality is detected by the first and second monitoring portions. Accordingly, it is possible to monitor a generic failure, and realize redundancy enabling control of the overall operation of the actuator, from start to finish, when a generic failure has occurred, thus realizing further simplification and streamlining of the configuration.

10 Claims, 4 Drawing Sheets

(56) References Cited

U.S. PATENT DOCUMENTS

| | | |
|---|---|---|
| 6,845,467 B1 | 1/2005 | Ditner et al. |
| 7,496,465 B2 * | 2/2009 | Chirico et al. ............... 702/117 |
| 2001/0018720 A1 | 8/2001 | Weigl et al. |
| 2003/0055550 A1 | 3/2003 | Lohberg et al. |
| 2003/0120399 A1 | 6/2003 | Yamamoto |
| 2006/0198737 A1 | 9/2006 | Matsui et al. |
| 2007/0033435 A1 | 2/2007 | Stange et al. |
| 2008/0005256 A1 | 1/2008 | Shibayama et al. |
| 2011/0066305 A1 * | 3/2011 | Lin et al. .......................... 701/3 |

FOREIGN PATENT DOCUMENTS

| | | |
|---|---|---|
| JP | H01-247803 A | 10/1989 |
| JP | H11-268692 A | 10/1999 |
| JP | 2001-251329 A | 9/2001 |
| JP | 2003-191898 A | 7/2003 |
| JP | 2006-240612 A | 9/2006 |

OTHER PUBLICATIONS

An Office Action; "Notice of Reason for Rejection," issued by the Japanese Patent Office on Mar. 5, 2014, which corresponds to Japanese Patent Application No. 2010-100821 and is related to U.S. Appl. No. 13/091,609; with English language translation.

An Office Action; "Notice of Reason for Rejection," issued by the Japanese Patent Office on Mar. 5, 2014, which corresponds to Japanese Patent Application No. 2010-100821 and is related to U.S. Appl. No. 13/091,609; with English language partial translation.

* cited by examiner

ACTUATOR CONTROL SYSTEM

CROSS-REFERENCE TO RELATED APPLICATIONS

This application claims priority to Japanese Patent Application No. 2010-100821. The entire disclosure of Japanese Patent Application No. 2010-100821 is hereby incorporated herein by reference.

BACKGROUND OF THE INVENTION

1. Field of the Invention

The present invention relates to an actuator control system including an operation control apparatus that controls operation of a device driven by an actuator by generating a command signal for commanding operation of the device, and an actuator control apparatus that controls the actuator in accordance with the command signal.

2. Description of Related Art

Conventionally, actuator control systems including an operation control apparatus that controls operation of a device driven by an actuator by generating a command signal for commanding operation of the device, and an actuator control apparatus that controls the actuator in accordance with the command signal are known (for example, see JP 2006-240612A). JP 2006-240612A discloses an actuator control system that controls operation of a control surface (operation of a device) of an aircraft. This actuator control system includes an FCC (Flight Control Computer) serving as an operation control apparatus and an ACE (Actuator Control Electronics) serving as an actuator control apparatus. Note that the ACE is provided as an actuator control apparatus that controls an actuator for driving a control surface.

The actuator control apparatus of the system disclosed in JP 2006-240612A is provided with a control portion (31) serving as a digital computing portion that generates a control signal for controlling operation of the actuator in accordance with a command signal for commanding operation of the control surface that is generated by the operation control apparatus. This actuator control apparatus is further provided with a monitoring portion (41) serving as a digital computing portion that monitors an abnormality relating to operation of the actuator control apparatus. This monitoring portion is configured to perform the same process as the above-described control portion. This provides a configuration that enables monitoring of the occurrence of a generic failure, that is, a failure that may occur commonly among the same pieces of software or hardware. Note that the actuator control apparatus of JP 2006-240612A is also provided with a backup control portion that generates the above-described control signal by being configured as an analog circuit having fewer functions than the above-described control portion. By additionally including this backup control portion, the above-described actuator control apparatus is configured to be able to control operation of the actuator even if a generic failure has occurred.

SUMMARY OF THE INVENTION

With the actuator control system disclosed in JP 2006-240612A, the actuator control apparatus is monitored for a generic failure by providing the monitoring portion that performs the same process as the control portion that generates a control signal for controlling operation of the actuator. By including the backup control portion provided as an analog circuit, the actuator control apparatus is configured to be able to continue control of operation of the actuator even if a generic failure has occurred.

However, with the actuator control system of JP 2006-240612A, the backup control portion is provided as an analog circuit having fewer functions than the control portion. Therefore, in order to achieve a configuration that can control the entire operation of the device driven by the actuator, from start to finish, when a generic failure has occurred, it is desired to realize further redundancy. For example, in the case of an actuator control system that controls operation of a control surface of an aircraft as disclosed in JP 2006-240612A, it is desired to realize further redundancy in order to achieve a configuration that can control the entire operation of the control surface, including the takeoff operation of the aircraft, when a generic failure has occurred.

One conceivable example of an actuator control system that can realize redundancy as described above is an actuator control system configured to include two actuator control apparatuses, each including control portions that are different in design, and also to include monitoring portions that perform the same process as the respective control portions. Another conceivable example is an actuator control system configured such that two control portions that are different in design are provided in a single actuator control apparatus and two monitoring portions that perform the same process as the respective control portions.

In the former actuator control system, which is configured to include two actuator control apparatuses, it is necessary to provide a plurality of actuator control apparatuses for a single actuator, causes an increase in the number of the constituting components. Similarly, also the latter actuator control system, which is configured to include two control portions that are different in design and the corresponding monitoring portions in an actuator control apparatus, causes an increase in the number of the constituting components. Each of these configurations also causes an increase in complexity of the configuration for switching the state of connection between the actuator and the control portions when an abnormality such as a generic failure has occurred. For this reason, it is difficult to realize further simplification and streamlining of the configuration of the actuator control system.

In view of the foregoing circumstances, it is an object of the present invention to provide an actuator control system that can monitor a generic failure and realize redundancy enabling control of the entire operation of a device, from start to finish, when a generic failure has occurred, thus realizing further simplification and streamlining of the configuration, for an actuator control system in which an actuator control apparatus controls an actuator for driving a device in accordance with a command of an operation control apparatus to operate the device.

According to a first feature of an actuator control system of the present invention for achieving the above-described object, an actuator control system includes an operation control apparatus that controls operation of a device driven by an actuator by generating a command signal for commanding operation of the device, and an actuator control apparatus that controls the actuator in accordance with the command signal, wherein the actuator control apparatus includes a first control portion that generates a control signal for controlling operation of the actuator in accordance with the command signal, a second control portion that generates a control signal for controlling operation of the actuator in accordance with the command signal and that is different in design from the first control portion, and a switching unit that switches a state of connection between the actuator and each of the first control portion and the second control portion such that one of the control signals generated by the first control portion and the second control portion is output to the actuator to control operation of the actuator, the operation control apparatus includes a command generation portion that generates the command signal, a first monitoring portion that monitors an abnormality relating to operation of the first control portion and a second monitoring portion that monitors an abnormality relating to operation of the second control portion, and the switching unit switches, when an abnormality is detected by one of the first monitoring portion and the second monitoring portion, the state of connection from a state where one of the first control portion and the second control portion is connected to the actuator to a state where the other of the first control portion and the second control portion is connected to the actuator.

With this configuration, an abnormality relating to operation of the actuator control apparatus for the processes performed by the first control portion and the second control portion is monitored by the first monitoring portion and the second monitoring portion, making it possible to achieve a configuration that monitors a generic failure. Also, the first control portion and the second control portion are configured to have different designs. When a generic failure has occurred and an abnormality is detected by one of the first monitoring portion and the second monitoring portion, the switching unit switches the connection to the actuator from one of the first and second control portions for which an abnormality is detected to the other. Accordingly, it is possible to realize redundancy enabling control of the entire operation of the device, from start to finish, when a generic failure has occurred. When the actuator control system having this configuration is provided as an actuator control system that controls operation of the control surface of an aircraft, it is possible to realize redundancy enabling control of the entire operation of the control surface, including the takeoff operation of the aircraft, when a generic failure has occurred. Moreover, with the actuator control system having this configuration, the operation control apparatus can be effectively used to handle the abnormality monitoring functions of the first control portion and the second control portion of the actuator control apparatus, thus reducing the abnormality monitoring functions performed within the actuator control apparatus. This can simplify the configuration of the monitoring portions in the actuator control apparatus in a redundant configuration including two control portions that are different in design, thus realizing simplification and streamlining of the configuration of the actuator control system as a whole.

Therefore, with this configuration, it is possible to monitor a generic failure and realize redundancy enabling control of the entire operation of a device, from start to finish, when a generic failure has occurred, thus realizing further simplification and streamlining of the configuration, for an actuator control system in which an actuator control apparatus controls an actuator for driving a device in accordance with a command of an operation control apparatus to operate the device.

According to a second feature of the actuator control system of the present invention, in the actuator control system having the first feature, the device is a control surface of an aircraft.

With this configuration, it is possible to monitor a generic failure and realize redundancy enabling control of the entire operation of a control surface, from start to finish (the entire operation of a control surface, including the takeoff operation of an aircraft), when a generic failure has occurred, thus realizing further simplification and streamlining of the configuration, for an actuator control system in which an actuator control apparatus controls an actuator for driving a control surface in accordance with a command of an operation control apparatus to operate the control surface.

According to a third feature of the actuator control system of the present invention, in the actuator control system having the first feature, the actuator control apparatus further includes a third monitoring portion that monitors an abnormality that relates to operation of the actuator control apparatus and that is different in type from an abnormality monitored by the first monitoring portion and the second monitoring portion.

With this configuration, abnormalities relating to operation of the actuator control apparatus are monitored by the first monitoring portion and the second monitoring portion provided in the operation control apparatus and the third monitoring portion provided in the actuator control apparatus after being classified by the type of abnormality. Accordingly, with regard to the types of abnormalities respectively monitored (the types of monitoring targets) by the first monitoring portion and the second monitoring portion, those monitoring targets that take too long to detect an abnormality via the communication data bus between the operation control apparatus and the actuator control apparatus can be monitored by the third monitoring portion on the actuator control apparatus side. On the other hand, those monitoring targets that require a large computing load can be monitored by the first monitoring portion and the second monitoring portion on the operation control apparatus side.

According to a fourth feature of the actuator control system of the present invention, in the actuator control system having the third feature, the first monitoring portion monitors an abnormality relating to operation of the first control portion by performing the same process as the first control portion, and comparing a result of the process with a result of the process performed by the first control portion, and the second monitoring portion monitors an abnormality relating to operation of the second control portion by performing the same process as the second control portion, and comparing a result of the process with a result of the process performed by the second control portion.

With this configuration, abnormalities of operation of the first control portion and the second control portion are monitored by the first monitoring portion and the second monitoring portion on the operation control apparatus side by performing the same processes as the first control portion and the second control portion of the actuator control apparatus, and performing a filtering operation or the like in which the results of the processes are compared. Accordingly, a monitoring target that requires a large computing load such as a filtering operation can be monitored by the first monitoring portion and the second monitoring portion of the operation control apparatus, making it possible to efficiently let the operation control apparatus and the actuator control apparatus to handle the abnormality monitoring functions in a distributed manner.

According to a fifth feature of the actuator control system of the present invention, in the actuator control system having the third feature, the third monitoring portion monitors at least one of an abnormality of a power source for supplying power for operating the actuator, and an abnormality of a current supplied via the actuator control apparatus for operating the actuator.

With this configuration, an abnormality of a power source for operating the actuator, an abnormality of a supplied current, such as overcurrent, and the like are monitored by the third monitoring portion on the actuator control apparatus side. Accordingly, those monitoring targets that take too long to detect an abnormality via the communication data bus between the operation control apparatus and the actuator control apparatus, including, for example, a power source abnormality and an abnormality such as overcurrent can be monitored by the third monitoring portion on the actuator control apparatus side.

According to a sixth feature of the actuator control system of the present invention, in the actuator control system having the third feature, the type of data respectively processed by the first monitoring portion and the second monitoring portion for monitoring an abnormality is set to be limited such that a load of a communication data bus between the operation control apparatus and the actuator control apparatus is less than or equal to a predetermined value.

With this configuration, the type of data processed by the first monitoring portion and the second monitoring portion on the operation control apparatus side for abnormality monitoring is set so as to limit the load of the communication data bus between the operation control apparatus and the actuator control apparatus. Accordingly, the amount of data processed by the first monitoring portion and the second monitoring portion can be optimized from the viewpoint of limiting the data to the type of data that needs to be processed on the operation control apparatus side, and therefore an increase in the load of the data bus can be suppressed. Although it is also conceivable to use a data bus capable of high-speed communication, it is possible, with the configuration of the present invention, to efficiently monitor an abnormality with a system that has been realized at a lower cost.

According to a seventh feature of the actuator control system of the present invention, in the actuator control system having the third feature, a communication protocol between the operation control apparatus and the actuator control apparatus is set such that data that are respectively processed by the first monitoring portion and the second monitoring portion for monitoring an abnormality is processed after being divided into first data that is processed in a predetermined period and second data that is processed over a period longer than the predetermined period.

With this configuration, the data processed by the first monitoring portion and the second monitoring portion on the operation control apparatus side for abnormality monitoring is processed after being divided into the first data that is processed in the predetermined short period and the second data that is processed in the long period. Accordingly, those monitoring targets having high accuracy requirement for abnormality detection and thus are desired to have a reduced time for abnormality detection can be processed as the first data, and those monitoring targets having relatively low accuracy requirement for abnormality detection can be processed as the second data. Accordingly, it is not necessary to uniformly lengthen the communication period of the data bus between the operation control apparatus and the actuator control apparatus, and it is possible to perform processing in an appropriate period for each of the monitoring targets by effectively utilizing the limited communication period, thus satisfying the accuracy requirement for abnormality detection. Although it is also conceivable to use a data bus capable of high-speed communication, it is possible, with the configuration of the present invention, to efficiently monitor an abnormality with a system that has been realized at a lower cost.

It should be appreciated that the above and other objects, and features and advantages of the present invention will become apparent from the following description taken in conjunction with the accompanying drawings.

DETAILED DESCRIPTION OF THE INVENTION

Hereinafter, an embodiment for carrying out the present invention will be described with reference to the accompanying drawings. The embodiment of the present invention can be widely applied as an actuator control system including an operation control apparatus that controls operation of a device driven by an actuator by generating a command signal for commanding operation of the device, and an actuator control apparatus that controls the actuator in accordance with the command signal.

Figure 1:
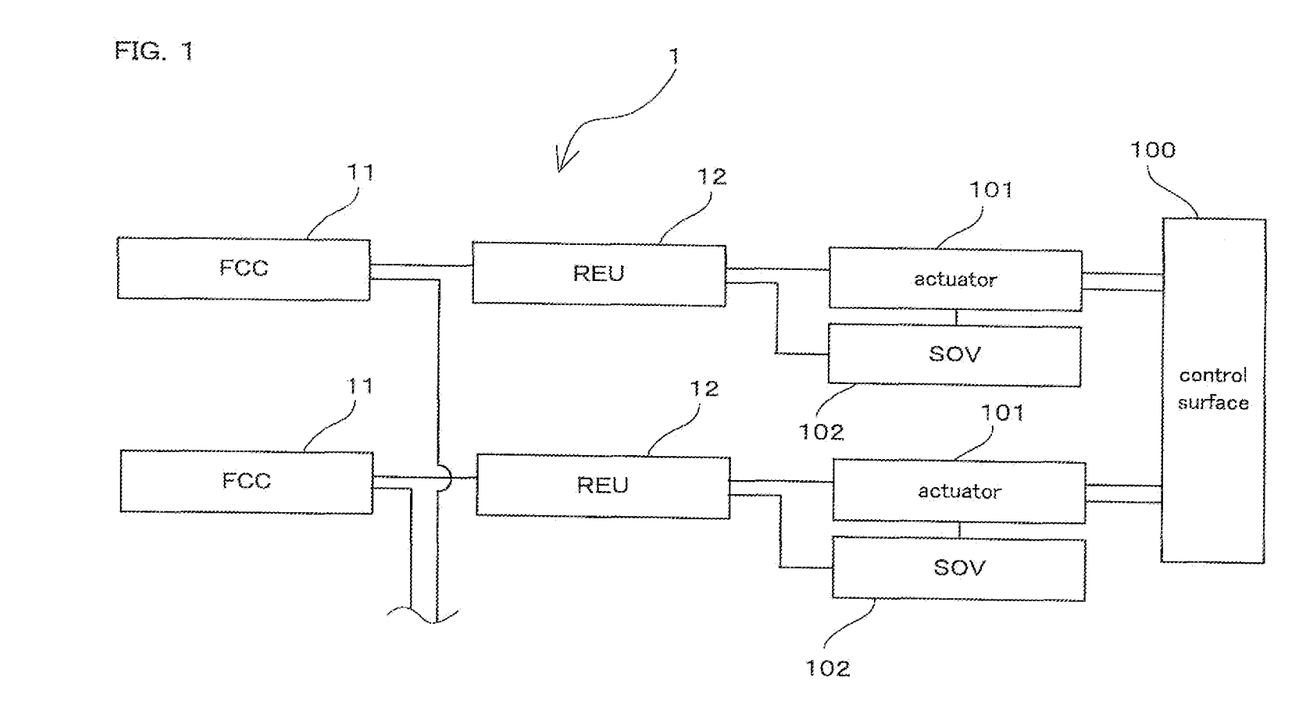
FIG. 1 is a block diagram schematically showing an actuator control system according to one embodiment of the present invention.

FIG. 1 is a block diagram schematically showing an actuator control system 1 according to one embodiment of the present invention. The actuator control system 1 shown in FIG. 1 is mounted on an aircraft (not shown), and is provided as a flight control system serving as an FBW (Fly By Wire) system that controls operation of a control surface 100 of the aircraft via electric signals.

Examples of aircraft moving surfaces (flight control surfaces) constituting the control surface 100 whose operation is controlled by the actuator control system 1 include an aileron, a rudder, and an elevator. The control surface 100 is driven by a plurality of actuators (101, 101), and each of the actuators 101 is provided, for example, as a mechanism including a hydraulic cylinder, and is configured to operate under the control of an REU 12, which will be described later.

The actuators (101, 101) are also configured to follow the motion of the control surface 100 (so as to be slaved to the control surface 100) by solenoid valves (102, 102) being respectively driven by the REUs 12. The solenoid valves (hereinafter, referred to as "SOVs") (102, 102) are provided so as to respectively correspond to the actuators 101. Note that the control surface 100 constitutes a "device" in this embodiment, which is driven by the actuators (101, 101). Furthermore, the "device" to which the actuator control system of this embodiment can be applied is not limited to devices configured as control surfaces such as an aileron, a rudder and a spoiler, and may be a leg of the landing gear or the like of an aircraft (a mechanism supporting the body of an aircraft on the ground).

As shown in FIG. 1, the actuator control system 1 is provided corresponding to each of the actuators 101 in the aircraft. Accordingly, a plurality of (in this embodiment, two) actuator control systems 1 are provided for a single control surface 100.

Figure 2:
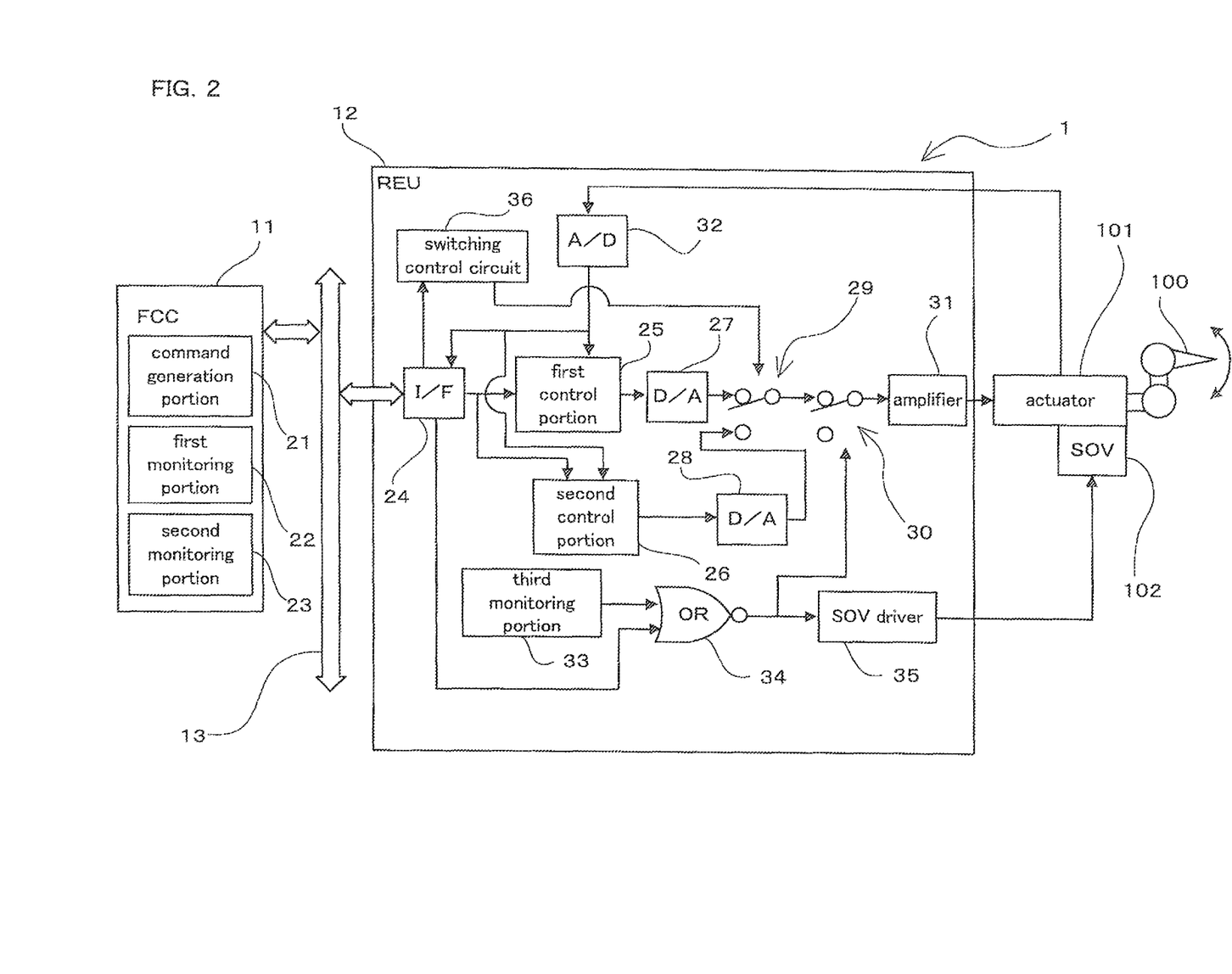
FIG. 2 is a block diagram showing the configuration of the actuator control system shown in FIG. 1 in further detail.

FIG. 2 is a block diagram showing the configuration of the actuator control system 1 in further detail. The actuator control system 1 includes an FCC (Flight Control Computer) 11, an REU (Remote Electronics Unit) 12, and a communication digital data bus 13 between the FCC 11 and the REU 12. Then, the FCC 11 and the REU 12 are provided corresponding to a single actuator 101.

Note that FIG. 2 shows a block diagram of one of a plurality of actuator control systems 1 provided for a single control surface 100. The block diagram of the other actuator control system 1 is the same as this and therefore has been omitted from FIG. 2. In the following, one of the actuator control systems 1 is described and thereby the description of the other actuator control system 1 having the same configuration has been omitted.

The FCC 11 shown in FIG. 2 is provided as an operation control apparatus of this embodiment that controls operation of the control surface 100 by generating a command signal for commanding operation of the control surface 100 in accordance with a manipulation signal or the like that is generated by the manipulation by a pilot (not shown). The FCC 11 includes a command generation portion 21 that generates the above-described command signal, and a first monitor portion 22 and a second monitor portion 23 that monitor an abnormality relating to operation of the ACE 12. Note that the command generation portion 21, the first monitoring portion 22 and the second monitoring portion 23 are configured, for example, by a CPU (Central Processing Unit), which is not shown, provided in the FCC 11 executing a program stored in a memory (not shown) provided in the FCC 11. Also, the FCC 11 is configured to transmit various signals including the above-described command signal as serial data to the REU 12 via the digital data bus 13. In addition, the first monitoring portion 22 is configured to monitor an abnormality relating to operation of a first control portion 25, which will be described later, of the REU 12. On the other hand, the second monitoring portion 23 is configured to monitor an abnormality relating to operation of a second control portion 26, which will be described later, of the REU 12.

The REU 12 shown in FIG. 2 is provided as an actuator control apparatus of this embodiment that controls the actuator 101 in accordance with a command signal from the FCC 11. The REU 12 is installed integrally with the actuator 101, or is installed at a place located close to the actuator 101. Also, the REU 12 is provided with an I/F (interface) 24, a first control portion 25, a second control portion 26, D/As (digital to analog converting portions) 27 and 28, relays 29 and 30, an amplifier 31, an A/D (analog to digital converting portion) 32, a third monitoring portion 33, an OR circuit 34, a NOT circuit 34a, an SOV driver 35, a switching control circuit 36, and so forth.

The I/F 24 is configured to allow a signal to be input and output into and from the FCC 11 via the digital data bus 13. The first control portion 25 is provided as a digital computing portion (digital arithmetic unit) and is configured to generate a control signal for controlling operation of the actuator 101, in accordance with the command signal from the FCC 11 that is input via the I/F 24, a feedback signal that is transmitted from the actuator 101, and sensor signals that are input from various sensors (not shown). Note that the first control portion 25 is configured, for example, by an FPGA, an ASIC, or a computer that stores software and functions according to that software.

The second control portion 26 is provided as a digital computing portion (digital arithmetic unit) and is configured to generate a control signal for controlling operation of the actuator 101, in accordance with the command signal from the FCC 11 that is input via the I/F 24, a feedback signal that is transmitted from the actuator 101, and sensor signals that are input from various sensors (not shown). The second control portion 26 is configured, for example, by an FPGA, an ASIC, or a computer that stores software and functions according to that software, and is provided as a digital computing portion that is different in design from the first control portion 25.

A control signal that has been generated by the first control portion 25 is converted from digital data to analog data in the D/A 27. A control signal that has been generated by the second control portion 26 is converted from digital data to analog data in the D/A 28. Also, in the REU 12, either one of the control signal that has been converted into the analog data in the D/A 27 and the control signal that has been converted into the analog data in the D/A 28 is input via the relays 29 and 30 to the amplifier 31. This signal is amplified in the amplifier 31, and is output to the actuator 101.

As will be described later, the relay 29 is switched to be connected to one of the D/As 27 and 28 in accordance with a control portion switching signal that is output from the switching control circuit 36. As will be described later, the relay 30 is switched to one of a state of being connected to the relay 29 and a state of being disconnected from the relay 29, in accordance with an SOV switching signal that is output from the NOT circuit 34a.

The A/D 32 is configured to convert the feedback signal from the actuator 101 from analog data to digital data. The feedback signal is input into the first control portion 25 and the second control portion 26, and also to the first monitoring portion 22 and the second monitoring portion 23 of the FCC 11 via the I/F 24. Accordingly, an abnormality that can be monitored based on data that is received via the A/D 32, the I/F 24, and the digital data bus 13 can be monitored by the first monitoring portion 22 and the second monitoring portion 23 of the FCC 11 without providing special hardware, since the A/D 32 is provided.

The switching control circuit 36 is provided as a logic circuit for controlling the switching of the state of connection of the relay 29. A signal for setting the initial state of connection of the relay 29 at the start of operation, which is the start of operation of an aircraft (not shown), of the actuator control system 1 and a signal for switching the state of connection of the relay 29 in the middle of operation of the actuator control system 1 are input into the switching control circuit 36 via the digital data bus 13 and the I/F 24.

For example, if the first control portion 25 is used as a control portion of the actuator 101 for control under normal conditions and the second control portion 26 is used as a backup control portion at the time of occurrence of an abnormality in the first control portion 25, then a signal for connecting the D/A 27 to the relay 30 is input into the switching control circuit 36 as a signal for setting the above-described initial state of connection. When this signal is input, the switching control circuit 36 controls the relay 29 such that the state where the D/A 27 and the relay 30 are connected is maintained, and the operation of the actuator 101 is controlled by the control signal from the first control portion 25 until an abnormality of operation of the first control portion 25 is detected.

Note that the signal configuration for setting the initial state of connection of the relay 29 is not limited to the above example, and various modifications can be made. For example, it is possible to adopt a configuration in which the second control portion 26 is used as a normal control portion and the first control portion 25 is used as a backup control portion. It is also possible to adopt, for example, a configuration in which it is not fixed which of the first control portion 25 and the second control portion 26 is used as which of a normal control portion and a backup control portion, but is changed periodically according to various conditions such as at every takeoff timing or any given number of takeoffs.

An abnormality detecting signal that has been generated based on the abnormality detection by the first monitoring portion 22 and the second monitoring portion 23 and has been output from the FCC 11 is input into the switching control circuit 36 via the digital data bus 13 and the I/F 24 as a signal for switching the state of connection of the relay 29 in the middle of operation of the actuator control system 1.

When the abnormality detecting signal that is generated as a result of an abnormality of operation of the first control portion 25 having been detected by the first monitoring portion 22 and is then output from the FCC 11 is input into the switching control circuit 36, the switching control circuit 36 outputs a control portion switching signal for switching the state of connection of the relay 29 from the state where the D/A 27 and the relay 30 are connected to the state where the D/A 28 and the relay 30 are connected. The state of connection of the relay 29 is switched in accordance with this control portion switching signal, as a result of which the operation control of the actuator 101 in accordance with the control signal generated by the first control portion 25 in which an abnormality has occurred is stopped, and the operation control of the actuator 101 in accordance with the control signal generated by the second control portion 26 in which no abnormality is detected will start immediately. Note that in the case where the D/A 28 and the relay 30 have been already connected when an abnormality of operation of the first control portion 25 is detected, the state of connection of the relay 29 is not switched even if the above-described control portion switching signal is output from the switching control circuit 36, as a result of which the state where the D/A 28 and the relay 30 are connected is maintained.

On the other hand, when the abnormality detecting signal that is generated as a result of an abnormality of operation of the second control portion 26 having been detected by the second monitoring portion 23 and is then output from the FCC 11 is input into the switching control circuit 36, the switching control circuit 36 outputs a control portion switching signal for switching the state of connection of the relay 29 from the state where the D/A 28 and the relay 30 are connected to the state where the D/A 27 and the relay 30 are connected. The state of connection of the relay 29 is switched in accordance with this control portion switching signal, as a result of which the operation control of the actuator 101 in accordance with the control signal generated by the second control portion 26 in which an abnormality has occurred is stopped, and the operation control of the actuator 101 in accordance with the control signal generated by the first control portion 25 in which no abnormality is detected will start immediately. Note that in the case where the D/A 27 and the relay 30 have been already connected when an abnormality of operation of the second control portion 26 is detected, the relay 29 state of connection is not switched even if the above-described control portion switching signal is output from the switching control circuit 36, as a result of which the state where the D/A 27 and the relay 30 are connected is maintained.

Note that the switching control circuit 36 and the relay 29 constitute a switching unit of this embodiment in which the state of connection between the actuator 101 and each of the first control portion 25 and the second control portion 26 is switched such that one of the control signals respectively generated by the first control portion 25 and the second control portion 26 is output to the actuator 101 to control operation of the actuator 101. Then, as described above, the switching unit constituted by the switching control circuit 36 and the relay 29 is configured to switch the state of connection from the state where the actuator 101 is connected to one of the first control portion 25 and the second control portion 26 to the state where the actuator 101 is connected to the other of the first control portion 25 and the second control portion 26, when an abnormality is detected by one of the first monitoring portion 25 and the second monitoring portion 26.

The third monitoring portion 33 is configured to monitor an abnormality that relates to operation of the REU 12 and that is different in type from the abnormality monitored by the first monitoring portion 22 and the second monitoring portion 23. Note that the third monitoring portion 33 is configured, for example, as an arithmetic unit or circuit included in the REU 12. The third monitoring portion 33 is configured to monitor, for example, an abnormality of a power source (not shown) that supplies power for operating the actuator 101 and an abnormality of a current (e.g., overcurrent) that is supplied via the REU 12 to the actuator 101 for operating the actuator 101. The third monitoring portion 33 may be further configured to monitor whether the communication between the REU 12 and the FCC 11 via the I/F 24 and the digital data bus 13 is carried out normally (to monitor an abnormality of communication). In this case, the third monitoring portion 33 is configured to monitor an abnormality of the above-described communication, for example, by performing processing such as a parity check.

On the other hand, the first monitoring portion 22 of the FCC 11 is configured to monitor an abnormality relating to operation of the first control portion 25, for example, by performing the same process as the first control portion 25 of the REU 12, and comparing a result of the process with a result of the process performed by the first control portion 25. Also, the second monitoring portion 23 of the FCC 11 is configured to monitor an abnormality relating to operation of the second control portion 26, for example, by performing the same process as the second control portion 26 of the REU 12, and comparing a result of the process with a result of the process performed by the second control portion 26. Note that the data on the result of the process performed by the first control portion 25 and the second control portion 26 is transmitted to the FCC 11 via the I/F 24 and the digital data bus 13.

The type of the data respectively processed by the first monitoring portion 22 and the second monitoring portion 23 for monitoring an abnormality relating to operation of the REU 12 is set to be limited such that the load of the digital data bus 13 is less than or equal to a predetermined value, in view of the condition that the increase in the load of the digital data bus 13 is minimized.

A communication protocol between the FCC 11 and the REU 12 is set such that the data that is respectively processed by the first monitoring portion 22 and the second monitoring portion 23 for monitoring an abnormality relating to operation of the REU 12 is processed after being divided into first data that is processed in a predetermined period and second data that is processed over a period longer than the predetermined period.

Figure 3A:
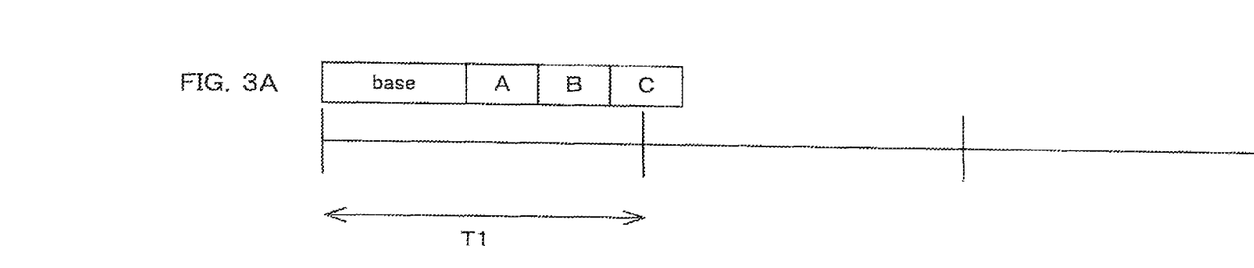
FIG. 3A is a chart schematically illustrating a communication process between an operation control apparatus and an actuator control apparatus of the actuator control system shown in FIG. 1.
Figure 3B:
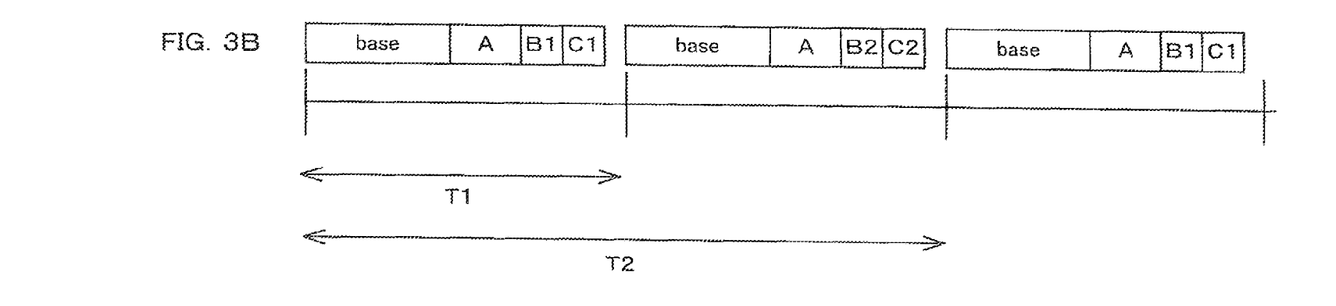
FIG. 3B is a chart schematically illustrating a communication process between an operation control apparatus and an actuator control apparatus of the actuator control system shown in FIG. 1.
Figure 3C:
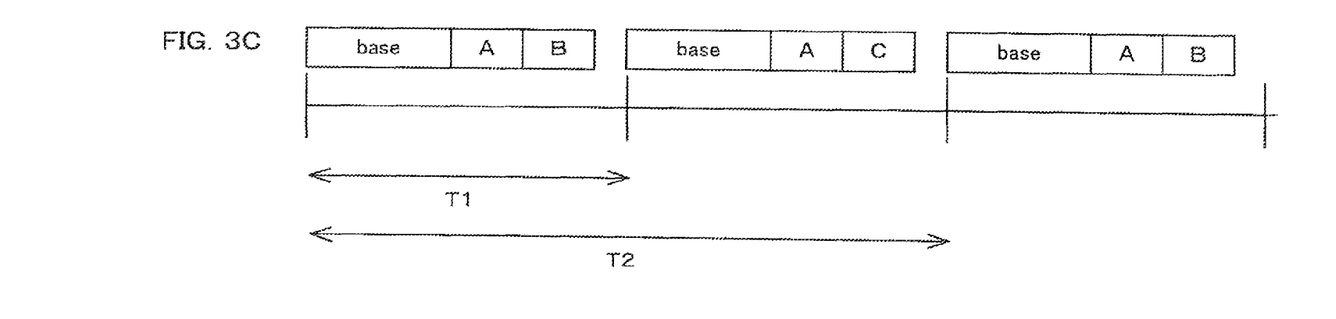
FIG. 3C is a chart schematically illustrating a communication process between an operation control apparatus and an actuator control apparatus of the actuator control system shown in FIG. 1.

FIGS. 3 (3A, 3B, 3C) are charts schematically illustrating exemplary communication processes between the FCC 11 and the REU 12 that are performed separately for the above-described first data and second data. The description with reference to FIG. 3 is given assuming that base data, data A, data B, and data C exist as the data that is periodically communicated via the digital data bus 13, as shown in FIG. 3A. Here, the base data is data that is not monitored by the first monitoring portion 22 or the second monitoring portion 23, but is data that is periodically communicated. On the other hand, the data A, the data B, and the data C are data that are monitored by the first monitoring portion 22 or the second monitoring portion 23. The data A is monitored with high accuracy requirement for abnormality detection and thus is desired to have a reduced time for abnormality detection, and the data B and the data C are monitored with relatively low accuracy requirement for abnormality detection.

When all of the data A, the data B, and the data C, in addition to the base data, are to be communicated in a predetermined period T1, not all of the data can be processed if the period T1 is short, as shown in FIG. 3A. If the period T1 is set longer in order to communicate all the data in a predetermined period, then the detection accuracy for the data A that is monitored with high accuracy requirement for detection will be reduced.

On the other hand, with the actuator control system 1, the communication process is performed as shown in FIG. 3B or 3C. FIGS. 3B and 3C illustrate exemplary communication processes in which the data A is set as the above-described first data that is processed in the predetermined period T1, and the data B and the data C are set as the above-described second data that are processed over the predetermined period T2 that is longer than the predetermined period T1.

In the case of the process shown in FIG. 3B, the data B that is the second data is divided into a plurality of data sets (B1, B2). Likewise, the data C that is the second data is also divided into a plurality of data sets (C1, C2). The plurality of data sets (B1, B2) resulting from dividing the data B and the plurality of data sets (C1, C2) resulting from dividing the data C are processed in the period T2, which is a period spanning a plurality of cycles of the predetermined period T1. On the other hand, in the case of the process shown in FIG. 3C, the data B and the data C are not divided. The data A that is the first data and the data B that is the second data are processed in a period T1, and the data A that is the first data and the data C that is the second data are processed in a period T1 that is different from the aforementioned period T1.

In both of the above-described communication processes shown in FIGS. 3B and 3C, the data A that is the first data is processed in the short predetermined period T1, and the data B and the data C that are the second data are processed in the long period T2. That is, the data A that is monitored with high accuracy requirement for abnormality detection can be processed in the short predetermined period T1, and the data B and the data C that are monitored with relatively low accuracy requirement for abnormality detection can be processed in the long period T2.

Here, a configuration in a case where an abnormality is detected by the first monitoring portion 22, the second monitoring portion 23 and the third monitoring portion 33 will be further described. When an abnormality is detected by either one of the first monitoring portion 22 and the second monitoring portion 23 of the FCC 11, an abnormality detecting signal is input into the switching control circuit 36, as described above. Then, switching control for the relay 29 is performed in accordance with a control portion switching signal that is output from the switching control circuit 36.

In contrast, when an abnormality is detected by both of the first monitoring portion 22 and the second monitoring portion 23, an REU abnormality detecting signal for switching the relay 30 is output from the FCC 11 to the OR circuit 34 via the digital data bus 13 and the I/F 24. Similarly, when an abnormality is detected by the third monitoring portion 33 of the REU 12, an REU abnormality detecting signal for switching the relay 30 is output from the third monitoring portion 33 to the OR circuit 34.

When the REU abnormality detecting signal is input into the OR circuit 34 from at least one of the FCC 11 and the third monitoring portion 33, an output signal as the logical OR of the REU abnormality detecting signal is output from the OR circuit 34 to the NOT circuit 34a. Then, the signal that has been input from the OR circuit 34 is inverted in the NOT circuit 34a, and the inverted signal is output from the NOT circuit 34a as an SOV switching signal. The SOV switching signal is output to each of the relay 30 and the SOV driver 35.

When the SOV switching signal is input from the NOT circuit 34a into the relay 30, the relay 30 is switched from the state where the amplifier 31 and the relay 29 are connected to the state where the amplifier 31 and the relay 29 are disconnected. That is, the state of the relay 30 is switched from the state shown in FIG. 2 to the state where the amplifier 31 and the relay 29 are disconnected, resulting in a state where the control signal from the D/A 27 or 28 is not input into the amplifier 31. Consequently, the control of the actuator 101 in accordance with the control signal generated by the first control portion 25 or the second control portion 26 is stopped.

On the other hand, when the SOV switching signal is input from the NOT circuit 34a into the SOV driver 35, the SOV driver 35 drives the SOV 102 such that the actuator 101 is slaved to an external load (is slaved to the control surface 100).

Next, the operation of the actuator control system 1 will be described. At the time of normal operation in which no abnormality is detected by the first monitoring portion 22 and the second monitoring portion 23 of the FCC 11 and the third monitoring portion 33 of the REU 12, the REU 12 controls the actuator 101 in accordance with the command signal from the FCC 11. Consequently, the operation of the control surface 100 driven the actuator 101 is controlled. In the case of using the first control portion 25 as a control portion of the actuator 101 for control under normal conditions and using the second control portion 26 as a backup control portion for use when an abnormality has occurred in the first control portion 25, the operation of the actuator 101 is controlled by the control signal from the first control portion 25 as shown in FIG. 2.

On the other hand, when the first monitoring portion 22 of the FCC 11 has detected an abnormality of the first control portion 25, an abnormality detecting signal relating to the first control portion 25 is output from the FCC 11, and is then input into the switching control circuit 36. Then, as described above, a control portion switching signal is output from the switching control circuit 36 to the relay 29, and the state of connection of the relay 29 is switched from the state where the D/A 27 and the relay 30 are connected to the state where the D/A 28 and the relay 30 are connected. Consequently, the operation control of the actuator 101 in accordance with the control signal generated by the second control portion 26 in which no abnormality is detected starts immediately. Note that the second control portion 26 is configured as a control portion having a different design from that of the first control portion 25 and serving as a digital computing portion, and therefore the same abnormality as that of the first control portion 25 (an abnormality that may constitute a generic failure) will not occur.

When the second monitoring portion 23 has detected an abnormality of the second control portion 26, the state of connection of the relay 29 will not be switched. In the case of using the second control portion 26 as a control portion for control under normal conditions and using the first control portion 25 as a backup control portion, the relationship between the first control portion 25 and the second control portion 26 as well as the relationship between the first monitoring portion 22 and the second monitoring portion 23 are simply reversed in the above description, and therefore the description has been omitted.

When both of the first monitoring portion 22 and the second monitoring portion 23 have detected an abnormality, or when the third monitoring portion 33 of the REU 12 has detected an abnormality, the SOV switching signal is output from the NOT circuit 34a to the relay 30 and the SOV driver 35. Then, as described above, the state of connection is switched to the state where the amplifier 31 and the relay 29 are disconnected, and the control of the actuator 101 in accordance with the control signal generated by the first control portion 25 or the second control portion 26 is stopped. Further, the SOV switching signal is input into the SOV driver 35, thus starting the control by the SOV driver 35 that drives the SOV 102 such that the actuator 101 is slaved to the control surface 100.

As described above, with the actuator control system 1, an abnormality relating to operation of the REU (actuator control apparatus) 12 for the processes performed by the first control portion 25 and the second control portion 26 is monitored by the first monitoring portion 22 and the second monitoring portion 23, making it possible to achieve a configuration that monitors a generic failure. Also, the first control portion 25 and the second control portion 26 are configured to have different designs. When a generic failure has occurred and an abnormality is detected by one of the first monitoring portion 22 and the second monitoring portion 23, the switching unit (29, 36) changes the connection to the actuator 101 from the one of the first and second control portions (25 and 26) for which an abnormality is detected to the other. Accordingly, it is possible to realize redundancy enabling control of the entire operation of the device (control surface 100), from start to finish, when a generic failure has occurred. That is, when the actuator control system 1 is provided as an actuator control system that controls the operation of the control surface 100 of an aircraft as in this embodiment, it is possible to realize redundancy enabling control of the entire operation of the control surface 100, including the takeoff operation of an aircraft, when a generic failure has occurred. Moreover, with the actuator control system 1, the FCC (operation control apparatus) 11 can be effectively used to handle the abnormality monitoring functions of the first control portion 25 and the second control portion 26 of the REU 12, thus reducing the abnormality monitoring functions performed within the REU 12. This can simplify the configuration of the monitoring portions in the REU 12 in a redundant configuration including two control portions that are different in design, thus realizing simplification and streamlining of the configuration of the actuator control system 1 as a whole.

Therefore, according to this embodiment, it is possible to monitor a generic failure and realize redundancy enabling control of the entire operation of a device (control surface), from start to finish (the entire operation of a control surface, including the takeoff operation of an aircraft), when a generic failure has occurred, thus realizing further simplification and streamlining of the configuration, for the actuator control system 1 in which an actuator control apparatus controls an actuator for driving a device (control surface of an aircraft) in accordance with a command of an operation control apparatus to operate the device (control surface).

With the actuator control system 1, abnormalities relating to operation of the REU 12 are monitored by the first monitoring portion 22 and the second monitoring portion 23 provided in the FCC 11 and the third monitoring portion 33 provided in the REU 12 after being classified by the type of abnormality. Accordingly, with regard to the types of abnormalities respectively monitored (the types of monitoring targets) by the first monitoring portion 22 and the second monitoring portion 23, those monitoring targets that take too long to detect an abnormality via the communication data bus between the FCC 11 and the REU 12 can be monitored by the third monitoring portion 33 on the REU 12 side. On the other hand, those monitoring targets that require a large computing load can be monitored by the first monitoring portion 22 and the second monitoring portion 23 on the FCC 11 side.

With the actuator control system 1, abnormalities of operation of the first control portion 25 and the second control portion 26 are monitored by the first monitoring portion 22 and the second monitoring portion 23 on the FCC 11 side by performing the same processes as the first control portion 25 and the second control portion 26 of the REU 12, and performing a filtering operation or the like in which the results of the processes are compared. Accordingly, a monitoring target that requires a large computing load such as a filtering operation can be monitored by the first monitoring portion 22 and the second monitoring portion 23 of the FCC 11, making it possible to efficiently let the FCC 11 and the REU 12 handle the abnormality monitoring functions in a distributed manner.

With the actuator control system 1, an abnormality of a power source for operation of the actuator, an abnormality of a supplied current, such as overcurrent, and the like are monitored by the third monitoring portion 33 on the REU 12 side. Accordingly, those monitoring targets that take too long to detect an abnormality via the digital data bus 13 between the FCC 11 and the REU 12, including, for example, a power source abnormality and an abnormality such as overcurrent can be monitored by the third monitoring portion 33 on the REU 12.

With the actuator control system 1, the type of data processed by the first monitoring portion 22 and the second monitoring portion 23 on the FCC 11 side for abnormality monitoring is set so as to limit the load of the digital data bus 13 between the FCC 11 and the REU 12. Accordingly, the amount of data processed by the first monitoring portion 22 and the second monitoring portion 23 can be optimized from the viewpoint of limiting the data to the type of data that needs to be processed on the FCC 11 side, and therefore an increase in the load of the digital data bus 13 can be suppressed. Furthermore, compared with the case where a data bus capable of high-speed communication is used, it is possible to efficiently monitor an abnormality with a system that has been realized at a lower cost.

With the actuator control system 1, the data processed by the first monitoring portion 22 and the second monitoring portion 23 on the FCC 11 side for abnormality monitoring is processed after being divided into the first data that is processed in the predetermined short period T1 and the second data that is processed in the long period T2. Accordingly, those monitoring targets having high accuracy requirement for abnormality detection and thus are desired to have a reduced time for abnormality detection can be processed as the first data, and those monitoring targets having relatively low accuracy requirement for abnormality detection can be processed as the second data. Consequently, it is not necessary to uniformly lengthen the communication period of the digital data bus 13 between the FCC 11 and the REU 12, and it is possible to perform processing in an appropriate period for each of the monitoring targets by effectively utilizing the limited communication period, thus satisfying the accuracy requirement for abnormality detection. Furthermore, compared with the case where a data bus capable of high-speed communication is used, it is possible to efficiently monitor an abnormality with a system that has been realized at a lower cost.

Although an embodiment of the present invention has been described thus far, the present invention is not limited to the above-described embodiment, and various modifications may be made within the scope recited in the claims. For example, the following modifications are possible.

(1) Although this embodiment was described, taking, as an example, a case where an actuator control system is provided as a flight control system that controls operation of an control surface of an aircraft, this need not be the case. The present invention may also be applied to an actuator control system other than a flight control system. For example, the present invention may be applied to an actuator control system that controls the operation of a leg such as landing gear of an aircraft.

(2) The classification between the monitoring target of the first monitoring portion and the second monitoring portion and the monitoring target of the third monitoring portion is not limited to that illustrated in this embodiment, and various modifications may be made. Further, it is possible to adopt a configuration in which an abnormality other than an abnormality relating to operation of the first control portion monitored by the first monitoring portion and an abnormality relating to operation of the second control portion monitored by the second monitoring portion is monitored by the operation control apparatus, within an allowable communication load between the operation control apparatus and the actuator control apparatus via the data bus. It is also possible to adopt a configuration in which the monitoring target described as an abnormality monitored by the third monitoring portion in this embodiment is monitored by the operation control apparatus, within an allowable communication load.

(3) The third monitoring portion is not limited to the configuration illustrated in this embodiment, and may be provided in the actuator control apparatus as a plurality of arithmetic units, circuits or the like that handle the monitoring function in a divided manner.

Figure 4:
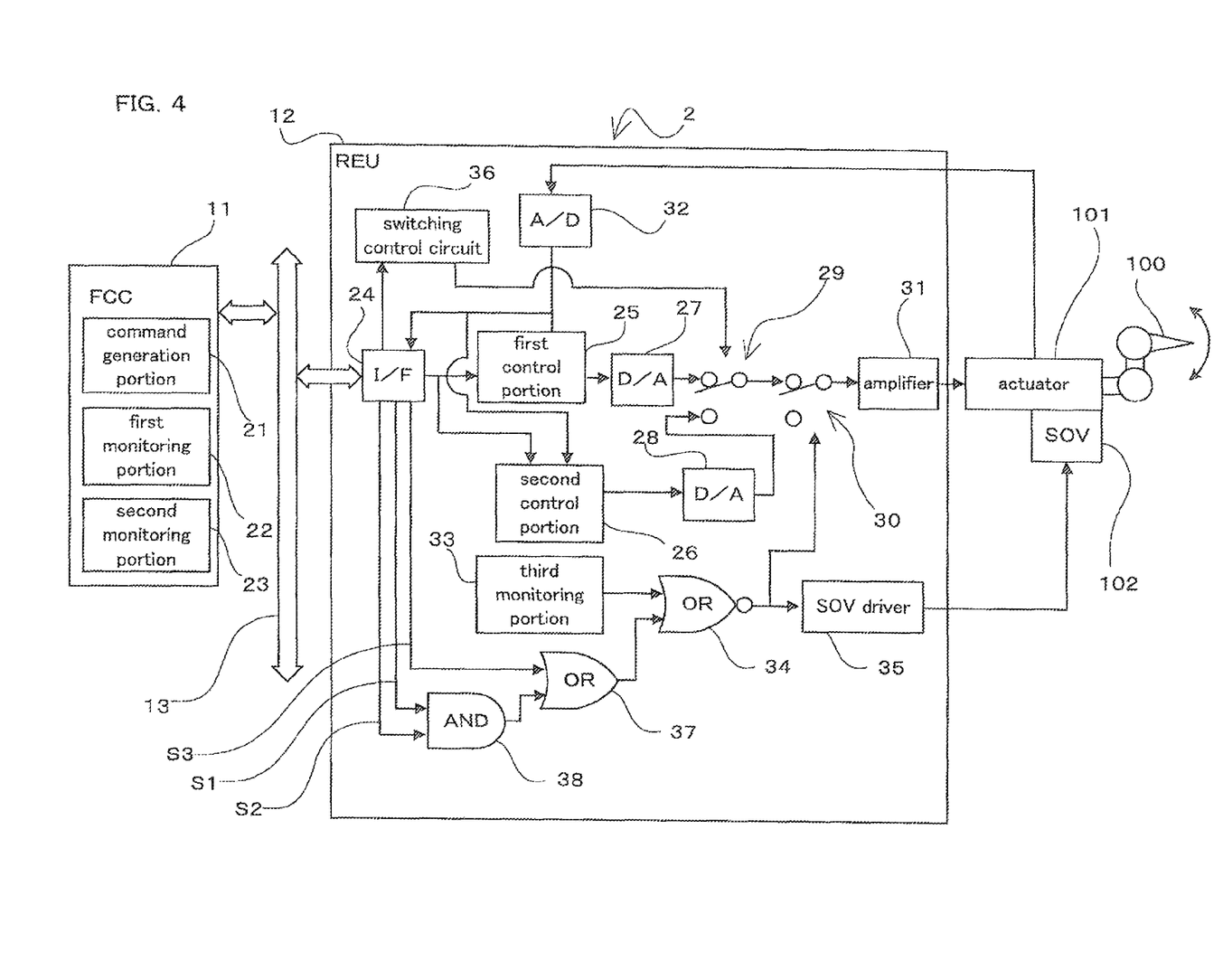
FIG. 4 is a block diagram showing a configuration according to a modification of the actuator control system shown in FIG. 2.

(4) Although this embodiment was described, taking as an example, a configuration in which the REU abnormality detecting signal for switching the relay 30 is output from the FCC 11 to the OR circuit 34 via the digital data bus 13 and the I/F 24 when an abnormality is detected by both of the first monitoring portion 22 and the second monitoring portion 23, this need not be the case. FIG. 4 is a block diagram showing a configuration of an actuator control system 2 according to a modification of the actuator control system 1 shown in FIG. 2. In the following description of the actuator control system 2, the differences in configuration from the actuator control system 1 shown in FIG. 2 will be described. The description of those elements configured in the same manner as with the actuator control system 1 has been omitted by using the same reference numerals in the drawings.

In the actuator control system 2 shown in FIG. 4 according to a modification, the REU 12 is further provided with an OR circuit 37 and an AND circuit 38 as circuits for inputting signals into the OR circuit 34.

When an abnormality is detected by the first monitoring portion 22 of the FCC 11, an abnormality detecting signal S1 relating to operation of the first control portion 25 is input into the switching control circuit 36 via the digital data bus 13 and the I/F 24, as in the case of the actuator control system 1, and the abnormality detecting signal S1 is input also into the AND circuit 38. When an abnormality is detected by the second monitoring portion 23 of the FCC 11, an abnormality detecting signal S2 relating to operation of the second control portion 26 as well is input into the switching control circuit 36 via the digital data bus 13 and the I/F 24, as in the case of the actuator control system 1, and the abnormality detecting signal S2 is input also into the AND circuit 38. Then, when both of the abnormality detecting signal S1 and the abnormality detecting signal S2 are input into the AND circuit 38, a signal that is an output signal as the logical AND of the signals S1 and S2 and that corresponds to the REU abnormality detecting signal as in the case of the actuator control system 1 is output to the OR circuit 37.

Further, an REU control stop signal (disengage signal) S3 is output from the FCC 11 to the OR circuit 37 via the digital data bus 13 and the I/F 24 until the preparation for operation for a takeoff of an aircraft (not shown) is completed and the takeoff is permitted (until the operational conditions enabling a takeoff are satisfied). Although not shown, the actuator control system 1 shown in FIG. 2 is configured such that a signal corresponding to the above-described REU control stop signal S3 is input into the OR circuit 34, for example.

When at least one of the REU control stop signal S3 and the output signal from the AND circuit 38 as the logical AND of the two abnormality detecting signals S1 and S2 is input into the OR circuit 37, an output signal as the logical OR of the signal is input from the OR circuit 37 into the OR circuit 34. Then, when at least one of the above-described output signal from the OR circuit 37 and the REU abnormality detecting signal from the third monitoring portion 33 is input into the OR circuit 34, an output signal as the logical OR of the signal is output from the OR circuit 34 to the NOT circuit 34a. Note that the processing after the input of the above-described output signal from the OR circuit 34 into the NOT circuit 34a is the same as that in the case of the actuator control system 1. That is, the signal that is input from the OR circuit 34 is inverted in the NOT circuit 34a, and the inverted signal is output as the SOV switching signal from the NOT circuit 34a to each of the relay 30 and the SOV driver 35.

The actuator control system 2 shown in FIG. 4 is an example of modifications, and various modifications can be made for the circuit configuration for processing signals when an abnormality is detected by the first monitoring portion 22, the second monitoring portion 23 and the third monitoring portion 33.

The present invention can be widely applied as an actuator control system including an operation control apparatus that controls operation of a device driven by an actuator by generating a command signal for commanding operation of the device, and an actuator control apparatus that controls the actuator in accordance with the command signal. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. An actuator control system comprising an operation control apparatus that controls operation of a device driven by an actuator by generating a command signal for commanding operation of the device, and an actuator control apparatus that controls the actuator in accordance with the command signal, wherein said operation control apparatus and said actuator control apparatus are connected via a digital data bus;

the actuator control apparatus includes a first control portion that generates a control signal for controlling operation of the actuator in accordance with the command signal, a second control portion that generates a control signal for controlling operation of the actuator in accordance with the command signal and that is different in design from the first control portion, and a switching unit that switches a state of connection between the actuator and each of the first control portion and the second control portion such that one of the control signals generated by the first control portion and the second control portion is output to the actuator to control operation of the actuator, the operation control apparatus includes a command generation portion that generates the command signal, a first monitoring portion that monitors an abnormality relating to operation of the first control portion and a second monitoring portion that monitors an abnormality relating to operation of the second control portion, and the switching unit switches, when an abnormality is detected by one of the first monitoring portion and the second monitoring portion, the state of connection from a state where one of the first control portion and the second control portion is connected to the actuator to a state where the other of the first control portion and the second control portion is connected to the actuator, wherein the actuator control apparatus further includes a third monitoring portion that monitors an abnormality that relates to operation of the actuator control apparatus and that is different in type from an abnormality monitored by the first monitoring portion and the second monitoring portion.

2. The actuator control system according to claim 1, wherein the device is a control surface of an aircraft.

3. The actuator control system according to claim 1, wherein the first monitoring portion monitors an abnormality relating to operation of the first control portion by performing the same process as the first control portion, and comparing a result of the process with a result of the process performed by the first control portion, and the second monitoring portion monitors an abnormality relating to operation of the second control portion by performing the same process as the second control portion, and comparing a result of the process with a result of the process performed by the second control portion.

4. The actuator control system according to claim 1, wherein the third monitoring portion monitors at least one of an abnormality of a power source for supplying power for operating the actuator, and an abnormality of a current supplied via the actuator control apparatus for operating the actuator.

5. The actuator control system according to claim 1, wherein the type of data respectively processed by the first monitoring portion and the second monitoring portion for monitoring an abnormality is set to be limited such that a load of a communication data bus between the operation control apparatus and the actuator control apparatus is less than or equal to a predetermined value.

6. The actuator control system according to claim 1, wherein a communication protocol between the operation control apparatus and the actuator control apparatus is set such that data that is respectively processed by the first monitoring portion and the second monitoring portion for monitoring an abnormality are processed after being divided into first data that is processed in a predetermined period and second data that is processed over a period longer than the predetermined period.

7. The actuator control system according to claim 1, wherein said switching unit includes a first relay which selectively changes the state between a first state where said first control portion is connected to the actuator and a second state where the second control portion is connected to the actuator according to the abnormality detected by one of the first monitoring portion and the second monitoring portion.

8. The actuator control system according to claim 7, wherein said actuator control apparatus further includes a second relay provided between the first relay and the actuator, said first relay is configured to terminate the connection between the first relay and the actuator upon receipt of a signal when an abnormality is detected by both of the first monitoring portion and the second monitoring portion.

9. The actuator control system according to claim 1, wherein said switching unit includes a first relay which selectively changes the state between a first state where said first control portion is connected to the actuator and a second state where the second control portion is connected to the actuator according to the abnormality detected by one of the first monitoring portion and the second monitoring portion.

10. The actuator control system according to claim 9, wherein said actuator control apparatus further includes a second relay provided between the first relay and the actuator, said first relay is configured to terminate the connection between the first relay and the actuator upon receipt of a signal when an abnormality is detected by the third monitoring portion.

* * * * *